US010382954B2

(12) United States Patent
Grimault et al.

(10) Patent No.: US 10,382,954 B2
(45) Date of Patent: Aug. 13, 2019

(54) SYSTEM AND METHOD FOR PROVIDING A SERVICE TO THE USER OF A MOBILE TERMINAL

(71) Applicant: Orange, Paris (FR)

(72) Inventors: Jean-Luc Grimault, Mondeville (FR); Franck Grupeli, Caen (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/106,635

(22) PCT Filed: Dec. 16, 2014

(86) PCT No.: PCT/FR2014/053364
§ 371 (c)(1),
(2) Date: Jun. 20, 2016

(87) PCT Pub. No.: WO2015/092261
PCT Pub. Date: Jun. 25, 2015

(65) Prior Publication Data
US 2016/0309327 A1 Oct. 20, 2016

(30) Foreign Application Priority Data
Dec. 19, 2013 (FR) ...................... 13 63035

(51) Int. Cl.
*H04L 9/32* (2006.01)
*H04W 4/14* (2009.01)
(Continued)

(52) U.S. Cl.
CPC ............ *H04W 12/06* (2013.01); *G07B 15/00* (2013.01); *H04L 9/3247* (2013.01); *H04L 51/36* (2013.01);
(Continued)

(58) Field of Classification Search
CPC ....... H04W 12/06; H04W 4/008; H04W 4/14; H04W 12/04; H04W 9/3271; G06B 15/00;
(Continued)

(56) References Cited

U.S. PATENT DOCUMENTS 7,580,897 B2 * 8/2009 Sakamura .............. G06Q 10/02
705/41
8,261,979 B2 * 9/2012 Gressel .................. G06Q 10/02
235/375
(Continued)

FOREIGN PATENT DOCUMENTS

DE 102010017861 A1 10/2011

OTHER PUBLICATIONS

International Search Report dated Mar. 19, 2015 for corresponding International Application No. PCT/FR2014/053364, filed Dec. 16, 2014.
(Continued)

*Primary Examiner* — Sharon S Lynch
(74) *Attorney, Agent, or Firm* — David D. Brush; Westman, Champlin & Koehler, P.A.

(57) ABSTRACT

A system for providing a service to the user of a mobile terminal. The system includes: an entity capable of generating an electronic ticket including identification data of the service and a public key of the mobile terminal complementary to a private key of the mobile terminal stored in a secure element of the mobile terminal; a module for delivering the ticket to an application of the mobile terminal running outside the secure element; a module capable of receiving the electronic ticket from the mobile terminal via short-distance communication channel; and a module capable of
(Continued)

authenticating the mobile terminal from the public key of the mobile terminal and a challenge implementing the private key of the mobile terminal.

12 Claims, 2 Drawing Sheets

(51) Int. Cl.
| | |
|---|---|
| *H04W 4/80* | (2018.01) |
| *G07B 15/00* | (2011.01) |
| *H04L 12/58* | (2006.01) |
| *H04L 29/06* | (2006.01) |
| *H04W 12/04* | (2009.01) |
| *H04W 12/06* | (2009.01) |

(52) U.S. Cl.
CPC ........ *H04L 63/0807* (2013.01); *H04L 63/123* (2013.01); *H04W 4/14* (2013.01); *H04W 4/80* (2018.02); *H04W 12/04* (2013.01); *H04L 9/3271* (2013.01); *H04L 63/0823* (2013.01); *H04L 2209/805* (2013.01)

(58) Field of Classification Search
CPC ... H04L 9/3247; H04L 51/36; H04L 63/0807; H04L 63/123
See application file for complete search history.

(56) References Cited

U.S. PATENT DOCUMENTS

| | | | | |
|---|---|---|---|---|
| 8,306,919 | B2* | 11/2012 | Sakamura | G06Q 10/02 705/64 |
| 9,594,896 | B2* | 3/2017 | Rosati | G06F 21/44 |
| 2003/0093695 | A1* | 5/2003 | Dutta | G06Q 20/045 726/4 |
| 2004/0059685 | A1* | 3/2004 | Sakamura | G06Q 10/02 705/65 |
| 2004/0196981 | A1* | 10/2004 | Nakano | G06F 21/10 380/280 |
| 2005/0273843 | A1* | 12/2005 | Shigeeda | H04L 9/3213 726/5 |
| 2006/0040726 | A1* | 2/2006 | Szrek | G06Q 20/341 463/17 |
| 2008/0109371 | A1* | 5/2008 | Sakamura | G06Q 10/02 705/67 |
| 2009/0143104 | A1* | 6/2009 | Loh | G06Q 20/32 455/558 |
| 2011/0068165 | A1* | 3/2011 | Dabosville | G06F 21/6209 235/375 |
| 2011/0112969 | A1* | 5/2011 | Zaid | G06Q 10/02 705/50 |
| 2012/0178366 | A1* | 7/2012 | Levy | G06K 7/10237 455/41.1 |
| 2012/0297204 | A1* | 11/2012 | Buer | H04L 63/0492 713/193 |
| 2014/0181955 | A1* | 6/2014 | Rosati | G06F 21/44 726/18 |
| 2014/0270172 | A1* | 9/2014 | Peirce | H04L 9/0819 380/270 |
| 2014/0298016 | A1* | 10/2014 | Ekberg | G06F 21/335 713/168 |
| 2015/0142483 | A1* | 5/2015 | Bergdale | G06Q 10/02 705/5 |
| 2015/0262195 | A1* | 9/2015 | Bergdale | G06Q 20/0457 705/5 |
| 2016/0171201 | A1* | 6/2016 | Schroder | H04B 5/0031 726/20 |
| 2017/0286873 | A1* | 10/2017 | Grimault | G06Q 20/045 |

OTHER PUBLICATIONS

Rawad Kilani et al., "Mobile Authentication with NEC Enabled Smartphones", Jan. 1, 2012 (Jan. 1, 2012), XP055133692.

Written Opinion of the International Searching Authority dated Mar. 19, 2015 for corresponding International Application No. PCT/FR2014/053364, filed Dec. 16, 2014.

English translation of the Written Opinion of the International Searching Authority dated Mar. 19, 2015 for corresponding International Application No. PCT/FR2014/053364, filed Dec. 16, 2014.

Dominikus et al. "mCoupons: An Application for Near Field Communication (NFC)". International Conference on Advanced Information Networking and Applications Workshops (AINAW'07 ). 2007

* cited by examiner

SYSTEM AND METHOD FOR PROVIDING A SERVICE TO THE USER OF A MOBILE TERMINAL

CROSS-REFERENCE TO RELATED APPLICATIONS

This Application is a Section 371 National Stage Application of International Application No. PCT/FR2014/053364, filed Dec. 16, 2014, the content of which is incorporated herein by reference in its entirety, and published as WO 2015/092261 on Jun. 25, 2015, not in English.

BACKGROUND OF THE INVENTION

The invention relates to the general field of dematerializing documents of title, otherwise known as "electronic tickets", and it relates more particularly to field of application in which electronic tickets are to be stored in a mobile terminal suitable for presenting said ticket in order to enable its user to have access to goods or more generally to a service.

A preferred but non-limiting application of the invention lies in applications where the mobile terminal presents the electronic ticket by using a near-field communication technique.

So-called "near-field" communication techniques are becoming widespread, and the technique that is the most used at present in mobile telephony is known by the acronym NFC.

In particular, transport services are known in which the users of public transport make use of a dedicated application on a mobile terminal in order to purchase electronic tickets and in order to validate a ticket on entering a bus or a tram by placing the mobile terminal close to an access control device suitable for communicating with the mobile terminal, or rather with a secure element of the mobile terminal such as its subscriber identity module (SIM) card, by using NFC means both in order to obtain the electronic ticket and in order to verify that it is valid.

An experimental service is also known for dematerializing tickets that give access to stadiums; the tickets are stored in the secure SIM cards of mobile terminals.

In the field of banking, payment services are also known in which certain banks have deployed contactless electronic payment terminals (EPTs) with traders that can be used equally well with a bank card and with an NFC mobile terminal having a secure element such as the SIM card.

The document "mCoupons: an application for near-field communication (NFC)" by Sandra Dominikus and Manfred Aigner, published under the number 0-7965-2847-3/07 at the 21st International Conference of the AINAW'07 in 2007 describes a system in which the user obtains an electronic coupon from an "issuer" first entity and cashes in the electronic coupon with a "cashier" second entity, the mobile terminal communicating with these two entities via NFC type means.

That document describes a method of making the system secure in which the "cashier" entity authenticates the mobile terminal by asking it to sign a challenge using its own private key and by verifying the signed challenge by using the public key of the mobile terminal as obtained from a public key server PKI.

That system presents a drawback in that the "cashier" entity with which the user cashes in the electronic coupon must be able to access the key server PKI in order to obtain the public key of the mobile terminal. Consequently, such a system cannot be extended to controlling access to services and premises that are not connected to a network.

The invention proposes a system for controlling access to a server by the user of a mobile terminal by validating an electronic ticket but without presenting such a drawback.

OBJECT AND SUMMARY OF THE INVENTION

Thus, in a first aspect, the invention provides a method of generating an electronic ticket usable from a mobile terminal in order to access a service, the method comprising:
  a step of obtaining the public key of the mobile terminal that is complementary to a private key of the mobile terminal as stored in a secure element of the mobile terminal; and
  a step of generating an electronic ticket, the ticket including fields comprising at least:
    identification data of the service; and
    the public key of the mobile terminal.

Correspondingly, the invention provides an electronic ticket generator entity, the ticket being usable from a mobile terminal to access a service, the entity comprising:
  a module for obtaining the public key of the mobile terminal that is complementary to a private key of the mobile terminal as stored in a secure element of the mobile terminal; and
  a module for generating an electronic ticket, the ticket including fields containing at least:
    identification data of the service; and
    the public key of the mobile terminal.

In a second aspect, the invention provides a method of authenticating a mobile terminal bearing an electronic ticket, the method comprising:
  a step of receiving the ticket from the mobile terminal by short-range communication means;
  a step of extracting a public key from the mobile terminal and contained in the ticket;
  a step of generating a random number;
  a step of short-range communication with a secure element of the mobile terminal, in order to ask the secure element to sign the random number with a private key of the mobile terminal as stored in the secure element; and
  a step of authenticating the mobile terminal from the signed random number and the public key.

Correspondingly, the invention also provides a module for authenticating a mobile terminal bearing an electronic ticket, the module comprising:
  a module for short-range reception of the ticket from the mobile terminal;
  a module for extracting a public key from the mobile terminal and contained in the ticket;
  a module for generating a random number;
  a module for short-range communication with a secure element of the mobile terminal, for asking the secure element to sign the random number with a private key of the mobile terminal as stored in the secure element; and
  a module for authenticating the mobile terminal on the basis of the signed random number and the public key.

Thus, and in general manner, the invention proposes inserting the public key of the mobile terminal in the electronic ticket itself so that the module authenticating the terminal when controlling access to the service can do so independently without having access to a communication network.

Consequently, the invention also provides a portal giving access to a service and including a mobile terminal authentication module as mentioned above.

The invention is intended in particular for the following kinds of use: ticket to a show, transport ticket, booking bicycles, . . . for all of which it is necessary to be in possession of a right to access a service, possibly of validity that is limited to a specified date or a defined duration.

The invention also provides a method of providing a service to the user of a mobile terminal, the method comprising:

- a method as mentioned above for generating an electronic ticket usable from the mobile terminal to access a service;
- a ticket delivery step suitable for delivering the ticket directly or via a third-party device, to an application of the mobile terminal, which application is executed outside the secure element;
- a method of authenticating the electronic ticket as mentioned above; and
- a step of controlling access to the service and suitable for validating the identification data of the service and for delivering the service only if the identification data of the service and the authenticity of the mobile terminal have been verified successfully.

Correspondingly, the invention also provides a system for providing a service to the user of a mobile terminal, the system comprising:

- an entity for generating an electronic ticket as mentioned above, the ticket being usable from a mobile terminal to access a service:
- a ticket issuing module suitable for delivering said ticket, either directly or via a third-party device, to an application of the mobile terminal, which application is executed outside the secure element;
    - a mobile terminal authentication module as mentioned above; and
    - a module for controlling access to the service and suitable for validating the identification data of the service and for providing the service only if the identification data of the service and the authenticity of the mobile terminal have been verified successfully.

It is fundamental to observe that in the invention, the electronic ticket is managed within the mobile terminal by an application that executes outside the secure element. In particular, the electronic ticket is stored in a memory of the mobile terminal outside the secure element.

The invention thus differs advantageously from all of the techniques presently in use that require an application specific to the service to be installed in the secure element of the mobile terminal (e.g. a SIM card).

In particular, the invention differs from known applications giving access to a show in which a virtual ticket is associated with a specific security application, both of which are stored in the SIM card.

Even though storage of the dematerialized ticket in the SIM card is very effective and is currently proving its worth, that technical solution still presents drawbacks from which the invention is free.

Specifically, storing applications in the SIM card requires infrastructures that are complex (known as "over the air" (OTA) infrastructures in compliance with techniques published by the GlobalPlatform Association). It is more complex to install an application in a SIM card than in a terminal, and that leads to installation times that are longer. Such OTA infrastructures are often available only to the manufacturers of SIM cards, and that also leads to additional costs.

Furthermore, a secure application specific to a service that is executed in the SIM card requires the card to have enough memory, which is not always possible.

Finally, a secure application in the SIM card often does not suffice to cover usage situations and it needs to be associated with an application in the mobile terminal. Mention may be made of the need for the client to be able to consult the stored ticket using an attractive graphics application adapted to the service. This involves a combination of the specific application on the mobile terminal interacting with the specific secure application on the SIM card, and such a technical combination can be complex to develop and test.

In the context of the invention, the secure element of the mobile terminal (e.g. SIM card) is used solely as strong authentication means, i.e. for providing proof that the mobile terminal that has been brought close to the portal does indeed contain the appropriate secure element.

However the invention avoids any need to load an application that is specific to the service in the secure element, such that the role of the secure element, which is limited to authentication, remains identical regardless of the service (transport ticket, access to a football stadium, . . . ).

In accordance with the invention, the electronic tickets are loaded into the mobile terminal itself, by using flexible and simple techniques known to the person skilled in the art (by SMS, by MMS, or by http downloading, . . . ) without there being any need to have recourse to the much more complex techniques that are used for loading applications into a SIM card via an expensive OTA platform.

The user of the invention can also personally install the application on a mobile terminal. Such an application can be adapted to each type of service or indeed to each service (logo and menus that are appropriate, including being adapted to the mobile terminal) since there is no complex interaction between the application and the generic authentication application that is executed by the secure element.

In a particular embodiment of the system of the invention, the mobile terminal authentication module or the portal incorporating it communicates with the terminal by the near-field communication means.

It should be observed that when reference is made to "close to the portal", it should be understood that the portal must be capable of being sure that the secure element that it is authenticating is indeed close to the portal. This certainty requires a "near-field communication" method, e.g. using NFC protocols. The invention may use NFC protocols or other present or future near-field communication techniques.

The important point is to avoid a fraudulent system being capable of making the portal believe that it is authenticating a secure element that is close, whereas in fact it is authenticating a card that may be several kilometers away, via a fraudulent relay link installed in the mobile equipment by a pirate. For a transport ticket, this type of fraud would enable a plurality of users to make remote use of a single SIM card that has been transformed into an "authentication server" for a plurality of fraudulent users making of use of the same subscription on different mobile terminals. That is why, in the invention, near-field communication is used between the portal and the secure element.

In a particular implementation, the method includes a step of signing the fields of the ticket by means of a private key of a ticket generator entity, and a step of inserting the signature in the electronic ticket.

In this implementation, the ticket generator entity includes means for signing said fields of the ticket by means of a private key of the entity, and means for inserting the signature in the electronic ticket.

In this particular embodiment, the system of the invention comprises:
- a module for verifying said ticket and suitable for verifying the integrity of the electronic ticket from the signature contained in the ticket and from a public key complementary to the private key used by the ticket generator entity for calculating said signature;
- the module for controlling access to the service being suitable for validating the identification data of the service and for delivering the service only if the identification data of the service, the integrity of the electronic ticket, and the authenticity of the mobile terminal are all verified successfully.

The invention thus makes it possible to guarantee that the electronic ticket has not been corrupted.

In a particular embodiment of the system of the invention:
- the fields of the electronic ticket representing the offer further include a key identifier that identifies the unique manner the pair constituted by the public key of the mobile terminal and the private key of the mobile terminal as stored in the secure element of the mobile terminal;
- the mobile terminal authentication module being suitable for obtaining the key identifier in order to authenticate said mobile terminal.

This particular embodiment enables the invention to be used with different key providers (operator, service supplier, secure element manufacturer, . . . ).

In a particular embodiment of the system of the invention:
- the fields of the electronic ticket representative of the offer further includes a reference to the algorithm used for calculating the signature;
- the ticket authentication module being suitable for obtaining this reference in order to authenticate said mobile terminal.

This particular embodiment makes it possible to authenticate an electronic ticket signed with different types of signature.

In a particular implementation of the invention, the identification data of the service includes a validity duration for the service offer.

In a particular implementation of the invention, the identification data of the service includes an identifier of the service provider.

In a particular embodiment, the system of the invention includes a trusted entity suitable for providing the public key of the mobile terminal to the ticket generator entity.

In a particular embodiment of the system of the invention, the ticket issuing module is suitable for delivering the ticket to the mobile terminal by SMS, MMS, email, or HTTP downloading by the mobile terminal.

In a particular implementation of the invention, the ticket issued to the mobile terminal is not encrypted.

The invention also provides a signal including an electronic ticket, the ticket including fields comprising at least:
- identification data of a service; and
- the public key of a mobile terminal.

In a particular implementation, the various steps of the method of generating an electronic ticket and/or of the method of authenticating a mobile terminal are determined by computer program instructions.

Consequently, the invention also provides:
- a computer program on a data medium, the program being suitable for being performed by a computer, the program including instructions adapted to performing the above-mentioned method of generating an electronic ticket; and
- a computer program on a data medium, the program being suitable for being performed by a computer, the program including instructions adapted to performing the above-mentioned method of authenticating a mobile terminal.

The program may use any programming language, and be in the form of source code, object code, or code intermediate between source code and object code, such as in a partially compiled form, or in any other desirable form.

The invention also provides a computer readable data medium, including computer program instructions as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the invention appear in the light of the following description made with reference to the accompanying drawings, in which.

DETAILED DESCRIPTION OF AN EMBODIMENT

Figure 1:
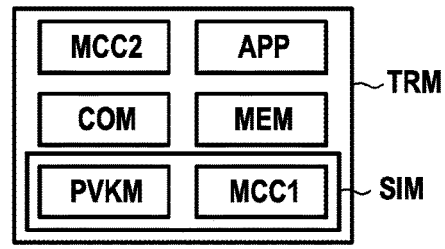
FIG. 1 shows a mobile terminal suitable for use in the invention.

FIG. 1 shows a mobile terminal TRM suitable for use in the invention. The mobile terminal TRM includes a secure element, namely a SIM card, that has a private key PVKM. In accordance with the invention, the SIM card does not have an algorithm or data specific to said service, it is used only for authenticating the terminal TRM bearing the ticket.

The SIM card has short-range communication means MCC1 or an interface to a component in the mobile terminal capable of performing near-field communication (NFC), e.g. an NFC contactless frontend (CLF) component.

The mobile terminal TRM also has short-range communication means MCC2 that are distinct from the means MCC1 of the SIM card.

By way of example, the short-range communication means MCC1 and MCC2 are NFC type means.

The mobile terminal TRM also has mobile communication means COM suitable for receiving an electronic ticket and for storing it in a memory MEM.

The mobile terminal includes an application APP. The application APP and the memory MEM are not included within the SIM secure element.

Figure 2:
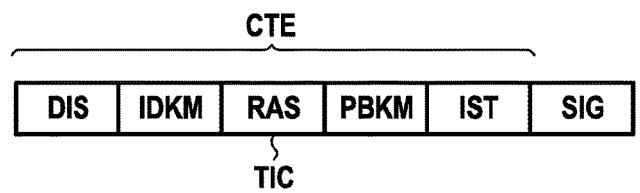
FIG. 2 shows an electronic ticket TIC in a particular embodiment of the invention.

FIG. 2 shows an electronic ticket TIC in a particular embodiment of the invention.

The electronic ticket TIC has fields CTE and a signature SIG of these fields obtained by an encryption algorithm that is itself known to the person skilled in the art.

In the presently-described embodiment, the fields CTE are type length value (TLV) encoded, so the data may be of different lengths.

In accordance with the invention, the fields CTE comprise a field DIS having data giving information about the service (the service-part of the ticket) and the public key PBKM that is complementary to the private key PVKM stored in the SIM card of the mobile terminal TRM.

The field DIS gives the right conferred by possessing the ticket: for example, a right to access a show or to access a transport network. By way of example, this field includes the identity of the service provider, the reference of the service, and the number of the ticket. The field DIS may also include information representative of the period of validity of the electronic ticket TIC.

In the presently-described embodiment, the fields CTE further comprise:
a key identifier IDKM, which identifies in unique manner the pair constituted by the public key PBKM of the mobile terminal and the private key PVKM of the mobile terminal; and
a reference RAS to the algorithm used for calculating the signature SIG; and
a field IST including an identifier of the signature.

Figure 3:
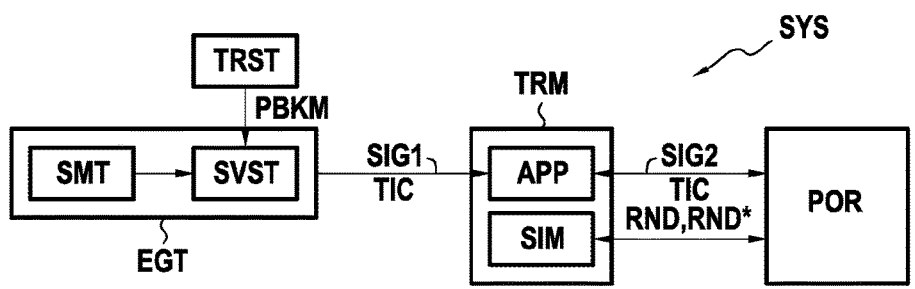
FIG. 3 shows an example of a system in accordance with a particular embodiment of the invention.

FIG. 3 shows an example of a system SYS in accordance with the invention.

In the presently-described embodiment, the system SYS includes a trusted entity TRST having knowledge of the {public key/private key} pairs of the SIM card and suitable for supplying the public key PBKM of the mobile terminal TRM to a ticket generator entity EGT.

In the presently-described embodiment, the ticket generator entity EGT includes a "ticket-service-server" SMT and a server SVST for selling and signing tickets.

In the presently-described example, the ticket-service-server SMT issues tickets relating to the service rendered, but without knowing the beneficiary (the client). It thus inserts into the ticket essentially the field DIS that contains information about the service: e.g. the name of the show, the date of the show, and the seat number.

In the presently-described example, the ticket is signed and sold by the server SVST. By way of example, the server may be administered by a leisure retail chain.

The server sells tickets. It thus associates the service-part of the ticket with a client by filling in the above-described fields IDSM, RAS, and PBKM in order to produce the complete ticket. Thereafter the server SVST signs this data set (in a manner explained below) and inserts the signature SIG into the ticket, as described with reference to FIG. 2.

Figure 4:
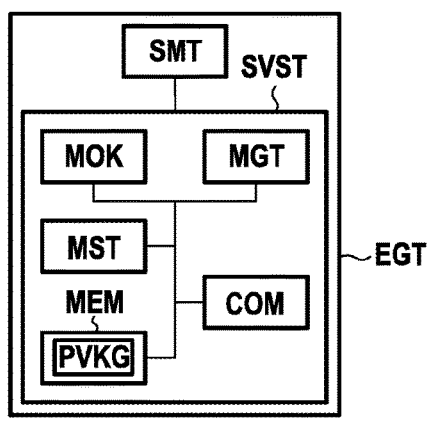
FIG. 4 shows an electronic ticket generator entity in accordance with a particular embodiment of the invention.

With reference to FIG. 4, the server SVST comprises:
a memory MEM including the private key PVKG of the ticket generator entity EGT;
a module MOK for obtaining from the trusted entity TRST the public key PBKM of the mobile terminal TRM;
a module MGT for generating the electronic ticket TIC; and
means MST for signing the fields CTE of the electronic ticket by means of the private key PVKG, the module MGT being suitable for inserting the signature SIG into the electronic ticket.

This entity EGT is suitable for delivering a signal SIG1 in accordance with the invention to the application APP of the mobile terminal TRM, this signal bearing the electronic ticket TIC. In the presently-described embodiment, the mobile terminal receives the ticket via its communication means COM. In a variant, it could use the short-range communication means MCC2 of the mobile terminal.

The mobile terminal TRM is also suitable for communicating with a portal POR controlling access to the service, e.g. an access portal to a stadium, to a theater, or to a public transport service (bus, metro, . . . ).

More precisely, the application APP of the mobile terminal communicates with the portal POR by using the short-range communication means MCC2 in order to deliver it a signal SIG2 in accordance with the invention that bears the electronic ticket TIC.

As described below, the portal POR is also suitable for establishing short-range communication with the short-range communication means MCC1 of the SIM card in order to authenticate the mobile terminal TRM.

Figure 5:
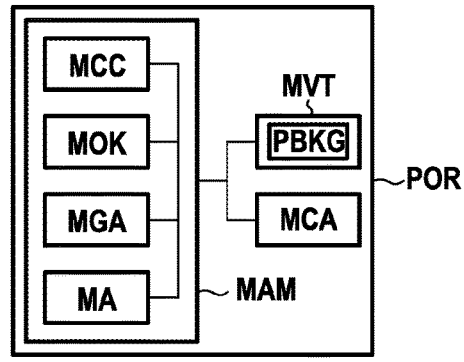
FIG. 5 shows a portal in accordance with a particular embodiment of the invention.

In the presently-described embodiment, and with reference to FIG. 5, the portal POP comprises:
a module MAM in accordance with the invention for authenticating the mobile terminal TRM bearing the electronic ticket. For this purpose, it uses the public key PBKM of the mobile terminal TRM contained in the ticket TIC and it engages with the secure element SIM of the terminal in order to issue a challenge:
the module MVT for verifying the integrity of the electronic ticket on the basis of the signature SIG contained in the ticket. For this purpose, it has the public key PBKG that is complementary to the private key PVKG used by the ticket generator entity EGT for calculating the signature SIG; and
a module MCA for controlling access to the service and suitable for validating the identification data DIS of said service and for providing the service only if the service identification data, the integrity of the electronic ticket, and the authenticity of the mobile terminal have all been verified successfully.

In accordance with the invention, the authentication module MAM of the mobile terminal TRM bearing an electronic ticket TIC comprises:
a module MCC for short-range reception of said ticket TIC and suitable for communicating with the short-range communication means MCC2 of the mobile terminal;
a module MOK for extracting the public key PBKM contained in the ticket, which key, in the absence of fraud, is the public key of the mobile terminal that is complementary to the private key PVKM stored in the secure element of the mobile terminal;

a module MGA for generating a random number RND;

a short-range communication module MCC suitable for communicating with the short-range communication means MCC1 of the secure element SIM of the mobile terminal. This communication module MCC enables the module MAM to ask the secure element SIM to sign the random number RND with the private key PVKM of the mobile terminal as stored in the secure element and to return the signed random number RND*; and a module MA for authenticating said mobile terminal TRM on the basis of the signed random number RND* and the public key PBKM.

The way the invention works is described below with reference to FIGS. 6 to 8.

Figure 6:
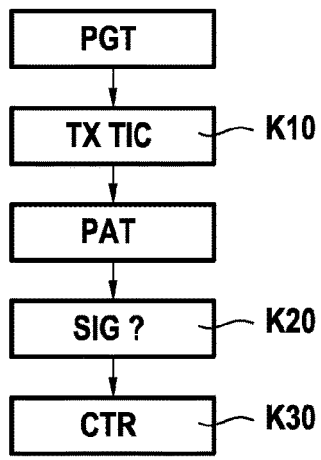
FIG. 6 is in the form of a flow chart showing the main steps of a method of providing a service to the user of a mobile terminal in accordance with an implementation of the invention.

FIG. 6 shows the main steps of a method for providing a service to the user of the mobile terminal TRM in accordance with an implementation of the invention. This method comprises:

a method PGT of generating an electronic ticket TIC in accordance with the invention and having main steps E2 to E20 that are described with reference to FIG. 7;

a step K10 of issuing the ticket TIC, directly or via a third-party device, to the application APP of the mobile terminal, which application is executed outside the secure element SIM;

a method PAT of authenticating the mobile terminal TRM in accordance with the invention and having main steps F10 to F50 that are described with reference to FIG. 8;

a step K20 of controlling access to said service; and a step K30 during which the portal POR provides access to the service only if the service identification data DIS, the integrity of the electronic ticket TIC, and the authenticity of the mobile terminal TRM have all been verified successfully.

Figure 7:
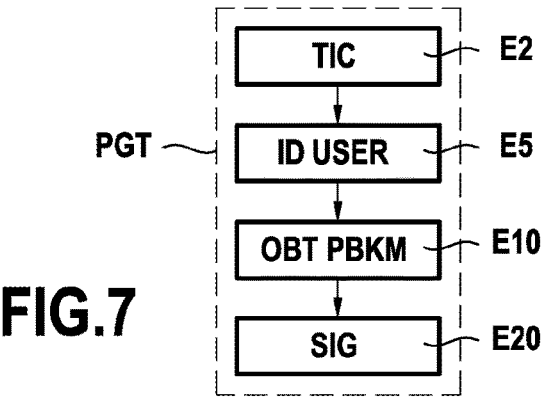
FIG. 7 is in the form of a flow chart showing the main steps of a method of generating an electronic ticket in accordance with an implementation of the invention.
Figure 8:
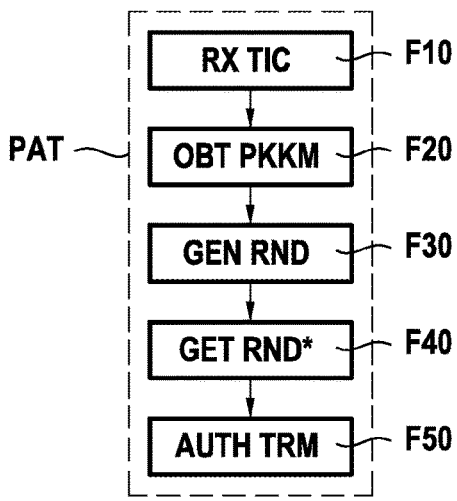
FIG. 8 is in the form of a flow chart showing the main steps of a method of authenticating a mobile terminal in accordance with an implementation of the invention.

With reference to FIG. 7, there follows a description of generating the electronic ticket TIC.

During a step D2, the ticket service server SMT creates an empty electronic ticket, and it inserts therein the service identification data DIS and transfers the ticket to the ticket selling and signing server SVST.

It is assumed that a user seeking to purchase an electronic ticket for this service accesses the server SVST by using the web browser of a computer. During a step E5, the server SVST identifies the client, receives the order for the ticket via the client's PC, and debits an account of the client. By way of example, this identification may involve a login and password input to the ticket-ordering web site. If the user is using a mobile terminal, identification may be performed using the MSISND telephone number as detected by the network.

During a step E10, the server SVST obtains the public key PBKM of the mobile terminal TRM by interrogating the trusted server TRST, inserts it into the ticket TIC, and fills in the other fields CET, namely the two-key reference IDKM, the reference to the signature algorithm RAS, the public key PBKM of the terminal, and the signature identifier IST as described with reference to FIG. 2. Thereafter, during the step E20, the server SVST for selling and signing tickets signs the fields CET by using the private key PVKG of the ticket generator entity EGT and inserts the signature SIG into the ticket in order to terminate generation of the ticket.

Returning to FIG. 6, the ticket generator entity EGT sends the signed ticket to the mobile terminal TRM during a step K10, e.g. by SMS, by MMS, or in an HTTP session if delivery is performed on the same terminal as that used for making the order.

The electronic ticket TIC is stored in non-encrypted form in a memory MEM of the mobile terminal, outside the secure element SIM.

It is assumed that the user seeks to make use of the electronic ticket TIC in order to access the service.

For this purpose, the user brings the terminal close to the portal POR.

The portal POR then performs a method of authenticating the mobile terminal TRM, as described below with reference to FIG. 8.

During a step F10, the terminal authentication module MAM of the portal POR receives the ticket TIC from the mobile terminal via its short-range communication means MCC. In particular, it is possible to make use of NFC communication means, low-energy Bluetooth communication means, or infrared communication means. In the present implementation, the same NFC technique is used as is to be used subsequently between the portal and the SIM card (see step F40). In known manner, the client brings the mobile terminal TRM close to the portal POR. The mobile terminal TRM must remain close to the portal until the portal has received the signed random number (step F40) resulting from the challenge issued to the secure element SIM. The user may be invited to hold the mobile terminal TRM close to the portal POR until hearing a beep or receiving a message indicting that the mobile terminal can be moved away from the portal, or until the portal authorizes access to the service.

In the presently-described implementation, the portal acts as an NFC reader. The application APP of the mobile terminal may be generic for a plurality of services, or it may be specific to one service with an attractive logo specific to that service. In accordance with the invention, this application does not run on the secure element SIM, thus giving it greater flexibility.

An NFC exchange is established between the portal POR and the application APP on the mobile terminal. If this is an NFC application specific to the service as selected by the portal POR, the way in which tickets accessible to the application are identified and the way in which a good ticket is selected are proprietary. If the application APP is generic, i.e. common to a plurality of services, then the ticket may be selected by means of a "service provider identification" subfield in the information field DIS of the ticket.

During a step F20, the terminal authentication module MAM extracts the public key PBKM contained in the ticket TIC.

During a step F30, the terminal authentication module MAM generates a random number RND. Until this moment, the secure element SIM of the mobile terminal has not been involved.

The authentication module MAM of the portal POR releases its NFC communication with the mobile terminal itself, and during a step F40 it sets up direct NFC communication with the secure element SIM in order to ask the secure element SIM to sign the random number RND using the private key PVKM of the mobile terminal as stored in the secure element.

More precisely, in the presently-described implementation, the portal POR sends the random number RND to a generic NFC application situated in the secure element SIM and used for all services.

When there might be a plurality of keys in the secure element SIM (e.g.: mobile operator key; supplier group key;

a plurality of ticket-seller keys), the portal POR sends the reference of the (public key/private key; pair contained in the IDKM field to the secure element SIM so as to enable it to select the appropriate private key PVKM for use in signing the random number.

When the secure element has a plurality of authentication algorithms (typically two or three), the random number RND is also accompanied by the reference to the authentication algorithm as obtained from the field RAS.

During a step F50, the terminal authentication module MAM authenticates the mobile terminal TRM from the signed random number RND* and the public key PBKM read from the ticket TIC in step F20.

During a step K20, the ticket integrity verification module MVT verifies the integrity of said electronic ticket from the signature SIG contained in the ticket and a public key PBKG complementary to the private key PVKG used by the ticket generator entity EGT for calculating the signature.

During a step K30, the access control module MCA verifies the service information data DIS. For example, it verifies whether the name of the show is correct, whether the date is correct, the seat number, the ticket number, . . . . To do this, the access control module MCA needs to have data of the same type as the service server SMT. During this step, the module MCA of the portal POR controlling access to said service provides access to the service only if the service identification data DIS, the integrity of the electronic ticket TIC, and the authenticity of the mobile terminal TRM have all been verified successfully.

In accordance with the invention, the terminal authentication step F50 and the step K20 verifying the identity of the ticket TIC may be performed locally in the portal POR, and it is not necessary for the portal to be connected to the Internet or to an Intranet.

The portal may be connected by a local network to one or two servers situated a few meters away and processing the request from all of the service access portals.

In the above-described implementation, service providers make use of the private key PVKM installed by the mobile operator in the SIM card of the terminal for the purpose of authenticating the mobile terminal TRM. The {public key/private key} pairs of SIM cards are generated by the mobile operator.

In a variant, the trusted entity TRST may be managed by a group of service providers that installs or has installed a private key in each SIM card of its clients and manages its own {public key/private key} pairs for the cards.

The trusted entity TRST may also be administered by the administrator of the server SVST for selling and signing tickets, which installs or has installed a private key in each SIM card of its clients and manages its own {public key/private key} pairs for the cards. Under such circumstances, the {public key/private key} pairs are used only for tickets generated by the ticket seller. In this implementation, the trusted entity TRST may be hosted in the server SVST for selling and signing tickets.

In the above-described embodiment, the module MAM for authenticating the mobile terminal TRM, the module MVT for verifying the integrity of the electronic ticket, and the module MCA for controlling access to the service are all incorporated in the portal POR.

In a variant, at least one of these modules MAM (but not MCC, which necessarily remains in the portal), MVT, or MCA may be run by a server that is external to the portal.

In this above-described implementation, the user purchased the service by making use of a computer web browser, i.e. a terminal other than the mobile terminal TRM used for accessing the service. In a variant, the ticket may be purchased using the mobile terminal TRM that is also used for passing through the portal POR.

The invention claimed is:

1. A system for providing a service to the user of a mobile terminal, the system comprising:
    a ticket generator entity for generating an electronic ticket, said ticket being usable from an application of a mobile terminal to access a service, said ticket generator entity comprising:
    at least one first computer; and
    at least one first non-transitory computer-readable medium comprising instructions stored thereon, which when executed by the at least one first computer configure the ticket generator entity to perform acts comprising:
        obtaining a public key (PBKM) of the mobile terminal that is complementary to a private key (PVKM) of the mobile terminal as stored in a secure element of the mobile terminal; and
        generating the electronic ticket, said ticket including fields containing at least:
            identification data of said service; and
            said public key (PBKM) of the mobile terminal;
        delivering said ticket, either directly or via a third-party device, to an application of the mobile terminal, which application is executed outside the secure element, wherein the ticket is stored in a memory of the mobile terminal outside the secure element of the mobile terminal is used by the application;
    a mobile terminal authentication device that is distinct from the mobile terminal, comprising:
    at least one second computer; and
    at least one second non-transitory computer-readable medium comprising instructions stored thereon, which when executed by the at least one second computer configure the mobile terminal authentication device to perform acts comprising:
        short-range reception of said ticket from the mobile terminal;
        extracting the public key (PBKM) from the field of said ticket containing the public key;
        generating a random number;
        short-range communication by a near-field communication component or a low-energy Bluetooth component with the secure element of the mobile terminal, for asking the secure element to sign said random number with the private key (PVKM) of the mobile terminal as stored in the secure element; and
        authenticating said mobile terminal on the basis of said signed random number and said public key (PBKM) of the mobile terminal; and
    an access control device, which controls access to said service and validates the identification data of said service and provides said service only when the identification data of the service and the authenticity of the mobile terminal have been verified successfully.

2. The system according to claim 1, wherein the mobile terminal authentication device is further configured by the instructions to perform acts comprising:
    verifying said ticket and verifying integrity of said electronic ticket on the basis of said signature contained in the ticket and the public key (PBKG) complementary to a private key (PVKG) used by said ticket generator entity for calculating said signature; and wherein said access control device is configured to validate the identification data of said service and for providing said service only when the service identification data, the integrity of the electronic ticket, and the authenticity of the mobile terminal have all been verified successfully.

3. The system according to claim 1, wherein:
the fields of the electronic ticket further include a key identifier that identifies in unique manner the pair made up by the public key (PBKM) of the mobile terminal and the private key (PVKM) of the mobile terminal as stored in the secure element of the mobile terminal; and
said mobile terminal authentication device being configured to obtain said key identifier for authenticating said mobile terminal.

4. The system according to claim 1, wherein:
the fields of the electronic ticket further include a reference to an algorithm used for calculating said signature; and
said module for authenticating said ticket being configured to obtain said reference in order to authenticate said mobile terminal.

5. The system according to claim 1, wherein the authentication data of said service include a duration for the validity of the identification data of said service.

6. The system according to claim 1, wherein the identification data of said service include an identifier of the service provider.

7. The system according to claim 1, wherein the system includes a trusted entity, which provides the public key (PBKM) of the mobile terminal to said ticket generator entity.

8. The system according to claim 1, wherein said ticket generator entity delivers said ticket to the mobile terminal by SMS, MMS, email, or HTTP downloading by the mobile terminal.

9. The system according to claim 1, wherein the ticket issued to the mobile terminal is not encrypted.

10. The system according to claim 1, wherein the mobile terminal authentication device communicates with said secure element of the terminal by a near-field communication component.

11. The system according to claim 1, further comprising an access portal, which includes the mobile terminal authentication device.

12. A method of providing a service to a user of a mobile terminal, the method comprising:
generating, with at least one first device, an electronic ticket usable from a mobile terminal to access a service, wherein generating comprises:
obtaining a public key (PBKM) of the mobile terminal that is complementary to a private key (PVKM) of the mobile terminal as stored in a secure element of the mobile terminal; and
generating an electronic ticket, said ticket including fields comprising at least:
identification data of said service; and
said public key of the mobile terminal (PBKM);
delivering said ticket directly or via a third-party device, from the at least one first device to an application of the mobile terminal, which application is executed outside the secure element, wherein the ticket is stored in a memory of the mobile terminal outside the secure element of the mobile terminal and is used by the application;
authenticating the electronic ticket with at least one second device that is distinct from the mobile terminal, comprising:
receiving said ticket from the mobile terminal by a short-range communication;
extracting the public key (PBKM) of the mobile terminal from the field of said ticket containing the public key;
generating a random number;
short-range communication by a near-field communication component or a low-energy Bluetooth component with the secure element of the mobile terminal, in order to ask the secure element to sign said random number with the private key (PVKM) of the mobile terminal as stored in the secure element; and
authenticating said mobile terminal from said signed random number and said public key (PBKM); and
controlling access to said service using an access control device, the controlling access including validating the identification data of said service and delivering said service only when the identification data of the service and the authenticity of the mobile terminal have been verified successfully.

* * * * *